No. 756,175. PATENTED MAR. 29, 1904.
A. F. MEISSELBACH & W. MEISSELBACH, Jr.
POCKET SCALE.
APPLICATION FILED FEB. 10, 1904.
NO MODEL.
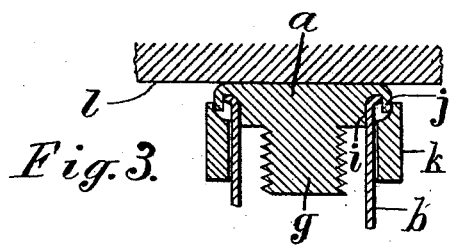
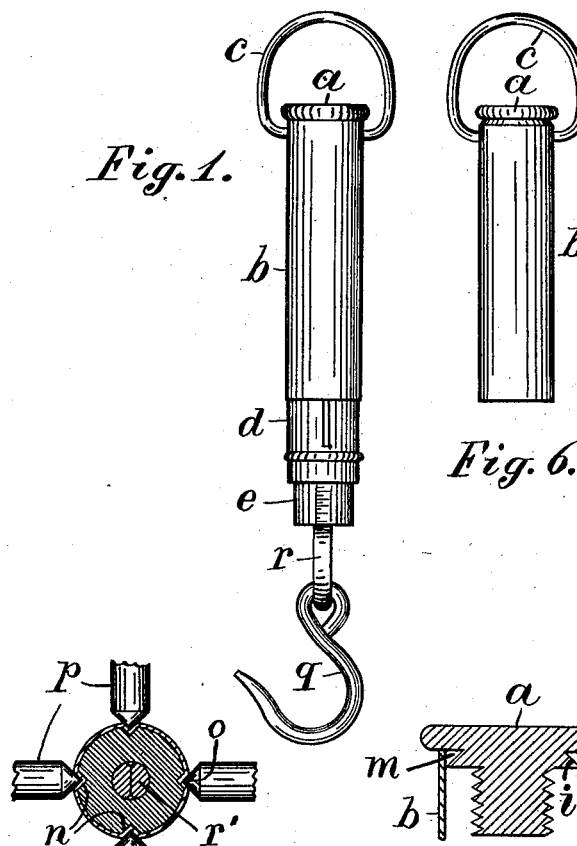
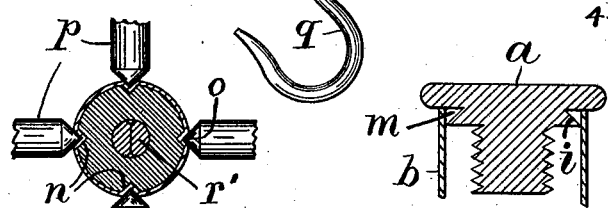
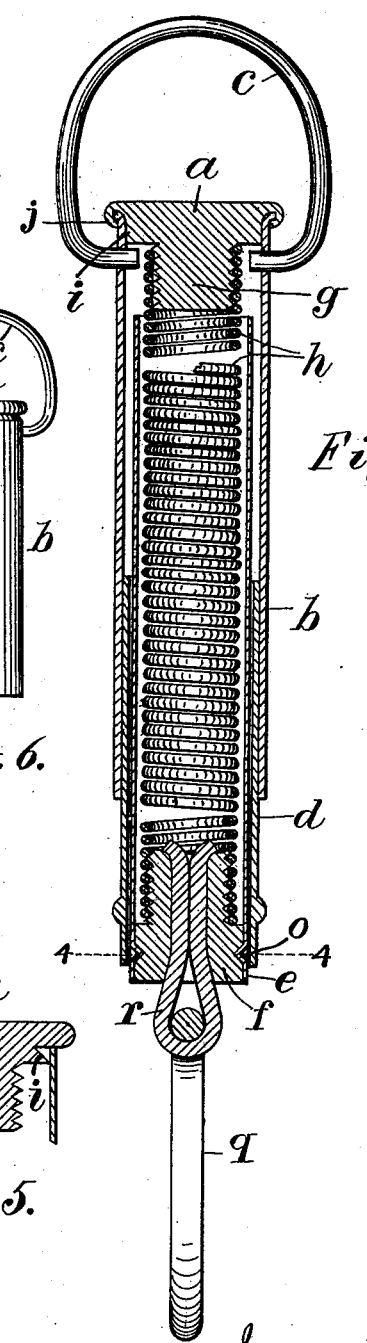
Attest:
L. Lee,
Arthur F. Heaton.
Inventors.
August F. Meisselbach,
William Meisselbach, Jr.
per Thomas L. Crane, Atty.

No. 756,175.

Patented March 29, 1904.

UNITED STATES PATENT OFFICE.

AUGUST F. MEISSELBACH AND WILLIAM MEISSELBACH, JR., OF NEWARK, NEW JERSEY.

POCKET-SCALE.

SPECIFICATION forming part of Letters Patent No. 756,175, dated March 29, 1904.

Application filed February 10, 1904. Serial No. 192,862. (No model.)

*To all whom it may concern:*

Be it known that we, AUGUST F. MEISSELBACH and WILLIAM MEISSELBACH, Jr., of 16 Prospect street, Newark, county of Essex, State of New Jersey, (whose post-office addresses are the same,) both citizens of the United States, have invented certain new and useful Improvements in Pocket-Scales, fully described and represented in the following specification and the accompanying drawings, forming a part of the same.

This invention relates to that class of spring-balances in which a scale-tube and a shell are secured, respectively, to opposite ends of a spiral spring. In such constructions it is common to secure the head and the draft-block to the spring by a screw-threaded shank and to attach the shell and tube to the head and draft-block, respectively, by a soldered joint. Such a joint is sufficiently strong, as the weight of the load is imposed wholly upon the spring, while the tube and shell move freely one within the other; but as such a balance is made of cheap elements the labor of soldering the joints upon the head and draft-block has heretofore proved a very material part of the total cost.

The object of the present invention is partly to furnish joints upon those parts which may be made without solder and by the rapid operation of mechanical tools, which press the metal into a suitable shape to lock the shell and tube upon the head and draft-block, respectively.

In our construction the head is provided adjacent to the threaded shank with a raised cylindrical seat to which the interior of the shell is snugly fitted, and the head and shell are so constructed that an annular engagement of these parts can be quickly and economically effected by the single movement of an upsetting-die. The draft-block, which is fitted to the free end of the spiral spring and carries the load, is formed with spaced depressions upon its outer side, and the scale-tube is locked to the draft-block by pressing studs from the metal of the tube into such depressions, which is readily effected by power-punches suitably spaced opposite to the depressions in the draft-block.

Heretofore the hook which carries the load to be weighed has been commonly attached to the draft-block by an eye secured rigidly in said block; but great convenience in applying the load to the hook and turning the spring-balance in a convenient position to see the index is secured by connecting the hook-carrier with the draft-block by a swivel-joint. This is readily effected by forming a bore in the center of the draft-block and making the hook-carrier of a loop, which encircles the eye of the hook and has its two parts extended through such bore and bent outwardly upon the inner end of the draft-block to support the load. Such hook-carrier is proportioned to turn in the central bore of the block, and thus furnishes a swivel-joint for the hook upon the draft-block.

Two methods of forming the annular engagement of the shell with the head are shown in the annexed drawings, Figure 1 being a side elevation of the balance with the head flanged over upon the end of the shell. Fig. 2 is a longitudinal section of the balance, showing the same construction upon an enlarged scale. Fig. 3 shows the form of such head before it is engaged with the shell. Fig. 4 is a section through the draft-block and scale-tube on line 4 4 in Fig. 2. Fig. 5 shows an alternative construction for the annular engagement of the head and shell, and Fig. 6 shows the head and shell engaged by such alternative joint.

*a* designates the head, *b* the shell secured thereto, and *c* the supporting-handle, having bent ends fitted to holes in the shell, as usual.

*d* is the usual adjustable index, fitted to the inside of the shell, and *e* is the scale-tube, to the lower end of which the draft-block *f* is secured.

The head and draft-block are provided each with the threaded shank *g*, upon which the ends of the spring *h* are screwed, the spring being broken near its opposite ends and the part between such breaks not being shown in section. In Figs. 1 to 3 the head is formed with the cylindrical seat $i$ fitted snugly to the interior of the shell and provided at the inner end of the seat with a groove surrounded by an annular flange $j$. The top or upper end of the shell is burred or turned outwardly and the groove is made of such width as to snugly fit the burred end of the shell. The flange projects over such burred edge sufficiently to be forced inwardly and locked over the edge, as shown in Fig. 2, by a single movement or blow of an annular upsetting-tool $k$. (Shown in Fig. 3.) The head is supported upon a bed (indicated by a surface $l$ in Fig. 3,) when the upsetting-tool is applied to the flange $j$, the parts at such time being inverted to set the head readily upon the bed and the upsetting-tool being moved downwardly by suitable mechanism, which is not shown, as it forms no part of the invention. The operation of the upsetting-tool turns the flange $j$ inwardly and forms a close annular engagement with the burred end of the shell, as shown in Fig. 2, the joint being completely concealed, as indicated in Fig. 1. The annular engagement of the same parts may also be effected, as shown in Figs. 5 and 6, by forming a groove $m$ in the seat $i$, over which the end of the shell is placed, such end being then forced into the groove, as shown in Fig. 6, by a suitable annular divided tool which operates upon several sides of the shell at once. It will be observed that in both the constructions for the head the seat forms a firm support for the shell during the operation of the tools, which effect the annular engagement of the parts, and we have therefore claimed such annular seat as an essential part of the construction and not merely the annular engagement of the parts.

The draft-block $f$ is shown with four conical depressions $n$ disposed equidistant around its middle, and studs $o$ upon the scale-tube are shown in Figs. 2 and 4 forced into the depressions, which is readily effected by a series of punches $p$, spaced similarly to the depressions, and which may be operated simultaneously upon the scale-tube when the draft-block is set with the spaced depressions opposite to the spaced punches. Four depressions and four punches are shown in Fig. 4, but any other number of equally-spaced depressions and punches can be employed. The studs $o$ serve to attach the scale-tube to the draft-block with sufficient firmness to hold the tube in a fixed relation to the block. The draft-block is shown in Fig. 2 with central bore having countersunk seat upon its inner end and the hook $q$ attached to the block by a hook-carrier $r$, which is preferably made of half-round wire, as shown in Fig. 4, looped around the eye of the hook and its two ends $r'$ laid parallel to form the stem of the carrier. Such stem is extended through the bore of the draft-block and the two ends bent apart over the countersunk seat upon the inner end of the block. The stem is adapted to turn so as to form a swivel upon the draft-block, while the bent ends are so proportioned as to sustain any load which the scale is adapted to weigh.

With the improvements described the spring-balance is of improved quality, while the method of manufacture very greatly diminishes the cost.

Having thus set forth the nature of the invention, what is claimed herein is—

1. In a spring-balance, the combination, with the head having the threaded shank $g$ for the attachment of the spring, and the annular seat $i$ at the base of the shank, of the shell $b$ fitted to the seat, the top of the shell and the head having an annular engagement for securing the shell to the head without solder, and the annular seat $i$ being adapted to support the shell when forming the annular engagement of the shell and head.

2. In a spring-balance, the combination, with the head having the threaded shank $g$ for the attachment of the spring, and the annular seat $i$ at the base of the shank with annular recess in the head at the base of the seat, of the shell $b$ having its end burred outwardly and fitted to the recess, and the head having a flange $j$ surrounding the recess for engagement with the burred end of the shell.

3. In a spring-balance, the combination, with the head having the threaded shank $g$ for the attachment of the spring, and the annular seat $i$ at the base of the shank with annular recess in the head at the base of the seat, of the shell $b$ having its end burred outwardly and fitted to the recess, and the head having a flange $j$ surrounding the recess, and locked over the burred end of the shell, as and for the purpose set forth.

4. In a spring-balance, the combination, with the head having spring attached thereto and shell surrounding the spring, of the draft-block $f$ attached to the free end of the spring and provided with raised cylindrical seat having spaced depressions $n$ as set forth, and the scale-tube $e$ fitted over the spring and secured to such seat by similarly-spaced studs $o$ forced from the tube into such depressions.

5. In a spring-balance, the combination, with the head having spring attached thereto and shell surrounding the spring, of the draft-block $f$ attached to the free end of the spring and provided with raised cylindrical seat having scale-tube secured thereon, the draft-block having a central bore, and a hook-carrier swiveled in such bore, as and for the purpose set forth.

6. In a spring-balance, the combination, with the head having spring attached thereto and shell surrounding the spring, of the draft-block $f$ attached to the free end of the spring and provided with raised cylindrical seat having scale-tube secured thereon, the draft-block having a central bore, with countersunk seat at its inner end, and a looped hook-carrier, having the stem of the loop extended through the bore and the two ends of the stem bent outwardly upon the countersunk seat, whereby the carrier is swiveled in the draft-block.

In testimony whereof we have hereunto set our hands in the presence of two subscribing witnesses.

AUGUST F. MEISSELBACH.
WILLIAM MEISSELBACH, JR.

Witnesses:
WM. FRIEDEL,
THOMAS S. CRANE.